United States Patent
Sodani et al.

(10) Patent No.: US 11,494,676 B2
(45) Date of Patent: Nov. 8, 2022

(54) ARCHITECTURE FOR TABLE-BASED MATHEMATICAL OPERATIONS FOR INFERENCE ACCELERATION IN MACHINE LEARNING

(71) Applicant: Marvell Asia Pte, Ltd., Singapore (SG)

(72) Inventors: Avinash Sodani, San Jose, CA (US); Ulf Hanebutte, Gig Harbor, WA (US); Chia-Hsin Chen, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/247,826

(22) Filed: Dec. 23, 2020

(65) Prior Publication Data

US 2021/0209492 A1    Jul. 8, 2021

Related U.S. Application Data

(63) Continuation of application No. 16/420,028, filed on May 22, 2019, now Pat. No. 10,929,760, which is a
(Continued)

(51) Int. Cl.
| | |
|---|---|
| *G06F 17/10* | (2006.01) |
| *G06N 5/04* | (2006.01) |
| *G06F 1/03* | (2006.01) |
| *G06F 15/78* | (2006.01) |
| *G06F 7/483* | (2006.01) |

(Continued)

(52) U.S. Cl.
CPC .............. *G06N 5/04* (2013.01); *G06F 1/0307* (2013.01); *G06F 7/483* (2013.01); *G06F 15/7821* (2013.01); *G06F 17/17* (2013.01); *G06N 20/00* (2019.01)

(58) Field of Classification Search
CPC ........ G06N 5/04; G06N 20/00; G06F 1/0307; G06F 7/483; G06F 15/7821; G06F 17/17
See application file for complete search history.

(56) References Cited

U.S. PATENT DOCUMENTS

| 5,329,611 A | 7/1994 | Pechanek et al. |
| 5,481,487 A | 1/1996 | Jang et al. |

(Continued)

OTHER PUBLICATIONS

NanoMesh: An Asynchronous Kilo-Core System-on-Chip, Tse, et al. 2013 19th IEEE International Symposium on Asynchronous Circuits and Systems.
(Continued)

*Primary Examiner* — Cheng Yuan Tseng

(57) ABSTRACT

A processing unit to support inference acceleration for machine learning (ML) comprises an inline post processing unit configured to accept and maintain one or more lookup tables for performing each of one or more non-linear mathematical operations. The inline post processing unit is further configured to accept data from a set of registers maintaining output from a processing block instead of streaming the data from an on-chip memory (OCM), perform the one or more non-linear mathematical operations on elements of the data from the processing block via their corresponding lookup tables, and stream post processing result of the one or more non-linear mathematical operations back to the OCM after the one or more non-linear mathematical operations are complete.

19 Claims, 8 Drawing Sheets

Related U.S. Application Data continuation-in-part of application No. 16/226,559, filed on Dec. 19, 2018, now Pat. No. 11,029,963.

(60) Provisional application No. 62/675,076, filed on May 22, 2018.

(51) Int. Cl.
*G06N 20/00* (2019.01)
*G06F 17/17* (2006.01)

(56) References Cited

U.S. PATENT DOCUMENTS

| | | | |
|---|---|---|---|
| 6,128,638 A * | 10/2000 | Thomas | G06F 1/0307 708/512 |
| 6,282,583 B1 | 8/2001 | Pincus et al. | |
| 6,577,312 B2 * | 6/2003 | Deering | G06T 5/20 345/428 |
| 7,089,380 B1 | 8/2006 | Schober | |
| 7,191,163 B2 | 3/2007 | Herrera et al. | |
| 7,539,717 B2 * | 5/2009 | Hussain | G06F 1/0307 708/277 |
| 7,809,663 B1 | 10/2010 | Birch et al. | |
| 8,200,940 B1 | 6/2012 | Lindholm | |
| 8,504,954 B1 * | 8/2013 | Arnold | G06F 30/327 716/104 |
| 8,583,896 B2 | 11/2013 | Cadambi et al. | |
| 8,738,860 B1 | 5/2014 | Griffin et al. | |
| 8,838,663 B2 * | 9/2014 | Tang | G06F 7/535 708/502 |
| 9,015,217 B2 * | 4/2015 | Arnold | G06F 1/03 708/235 |
| 10,161,786 B2 | 12/2018 | Chang et al. | |
| 11,106,432 B2 * | 8/2021 | Mangnall | G06F 7/483 |
| 2008/0040577 A1 | 2/2008 | Nemirovsky et al. | |
| 2011/0219208 A1 | 9/2011 | Asaad et al. | |
| 2011/0307890 A1 | 12/2011 | Achilles et al. | |
| 2015/0019836 A1 | 1/2015 | Anderson et al. | |
| 2015/0347012 A1 | 12/2015 | Dewitt et al. | |
| 2016/0170916 A1 | 6/2016 | Deshpande et al. | |
| 2016/0224465 A1 | 8/2016 | Morad et al. | |
| 2017/0228345 A1 | 8/2017 | Gupta et al. | |
| 2017/0351642 A1 | 12/2017 | Omtzigt | |
| 2018/0046458 A1 | 2/2018 | Kuramoto | |
| 2018/0047126 A1 | 2/2018 | Falkenstern et al. | |
| 2018/0114114 A1 | 4/2018 | Molchanov et al. | |
| 2018/0260220 A1 | 9/2018 | Lacy et al. | |
| 2018/0286016 A1 | 10/2018 | Bar-On et al. | |
| 2018/0293782 A1 | 10/2018 | Benthin et al. | |
| 2018/0307980 A1 | 10/2018 | Barik et al. | |
| 2018/0315158 A1 | 11/2018 | Nurvitadhi et al. | |
| 2019/0171604 A1 | 6/2019 | Brewer | |
| 2020/0082198 A1 | 3/2020 | Yao et al. | |
| 2020/0242734 A1 | 7/2020 | Wang et al. | |
| 2021/0133911 A1 | 5/2021 | Yao et al. | |

OTHER PUBLICATIONS

Ceze, L., et al. Colorama: Architectural Support for Data-Centric Synchronization, 2007, IEEE, pp. 134-144 (Year: 2007).

* cited by examiner

E ln(2) Table
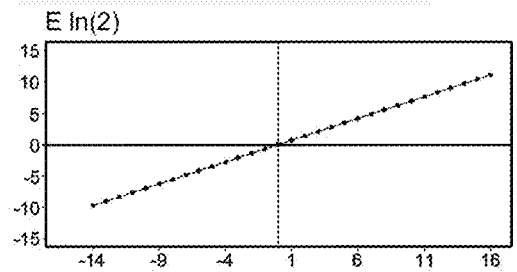
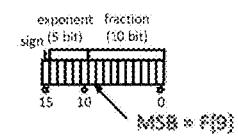
FIG. 3A

Tables for $r_{mtop} = 1/m_{top}$ and $-\log(r_{mtop})$

| mantissa right shift 6 | r=1/mtop | -ln(r) |
|---|---|---|
| 0 | 1 | 0 |
| 1 | 0.94141 | 0.060638 |
| 2 | 0.88867 | 0.1178 |
| 3 | 0.84228 | 0.17188 |
| 4 | 0.7998 | 0.22314 |
| 5 | 0.76172 | 0.27197 |
| 6 | 0.72765 | 0.31836 |
| 7 | 0.6958 | 0.36279 |
| 8 | 1.333 | -0.2876 |
| 9 | 1.2803 | -0.24683 |
| 10 | 1.2305 | -0.20764 |
| 11 | 1.1855 | -0.16992 |
| 12 | 1.1426 | -0.13354 |
| 13 | 1.1035 | -0.09845 |
| 14 | 1.0664 | -0.06451 |
| 15 | 1.0322 | -0.03174 |

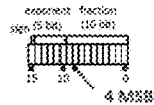

16 entries each
Table values are fp16
index into table calculated by
Rightshift by 6 of the fraction to get the 4 MSB

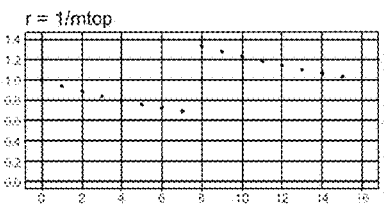

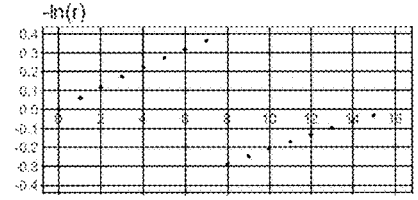

$m^{top}$: create a truncated fraction F by rightshift 6 followed by leftshift 6 and $m^{top}$ = 1.F or 1.F/2 for F[9] = 0 or 1
Could be implement as a single table, to retrieve both values with one access, as same index is used

FIG. 3B

1. If x=< 0, return NAN, else continue
2. Calculate index1 into Elog(2) table $$\text{index1} = E+14 = \begin{cases} \text{exponent-1} & \text{for F[9]} \\ \text{exponent} & \text{for F[9]} = 1 \end{cases}$$

3. Calculate index2 into r and -log(r) tables
   - Rightshift by 6 of the fraction to get the 4 MSB
4. Calculate m $$m = \begin{cases} 1.f & \text{for F[9]} = 0 \\ (1.f)/2 & \text{for F[9]} = 1 \end{cases}$$

5. Calculate y
   - y = m*Tf[index2] - 1
6. Taylor series log(1+y)
   - Log(1+y) = y * (-1/2 + 1/3 * y))
7. Total
   - Log(x) = $T_{Elog2}$[index1] + log(1+y) + $T_{-log(r)}$[index2]

FIG. 4 log(1+y) Table 16 entries that are fp16
 index3 = fraction%16
 max_index3 = 16 – int(fraction/128)
 index3 = int( ( index3 * max_index3 ) /16 )

Table calculated with python numpy as fp16 values
```
for i in range(0,16):
    y = i * 1.1024.
    T_log_1_plus_y.append(np.float16(np.log(1+y)))
```

FIG. 5

1. If x=<0, return NAN, as log is not defined, else continue
2. Calculate index1 into Elog(2) table $$\text{Index1} = E+14 = \begin{cases} \text{exponent1} & \text{for } F[9] = 0 \quad \text{equivalent to fraction} < 512 \\ \text{exponent} & \text{for } F[9] = 1 \end{cases}$$

3. Calculate index2 into -log(r) table
   - Rightshift by 4 of the fraction to get the 6 MSB
   - Index2 = 6MSB
4. Calculate index3 into log(1+y) table
   - Index3 = fraction%16
   - max_index3 = int (fraction/128)  (divide by 128 is a right shift 7)
   - Index3 = int((Index3 * max_index3) /16)  (first multiply by max_index3, then integer divide by 16, a right shift by 4)
5. Total
   - Log(x) = $T_{Elog2}$[index1] + $T_{log(1+y)}$[index3] + $T_{-log(r)}$[index2]

FIG. 6

$$\log(x) = E\log(2) + \log(m) \quad (1)$$

where $$E = \begin{cases} e & 1.f < \sqrt{2}, \\ e+1 & 1.f \leq \sqrt{2}, \end{cases} \quad (2)$$

$\begin{cases} F[9] = 0 \\ F[9] = 1 \end{cases}$ and $$m = \begin{cases} 1.f & 1.f < \sqrt{2}, \\ \dfrac{1.f}{2} & 1.f \leq \sqrt{2}. \end{cases} \quad (3)$$

e=exponent-15, f=significantbits$_2$

FIG. 7A

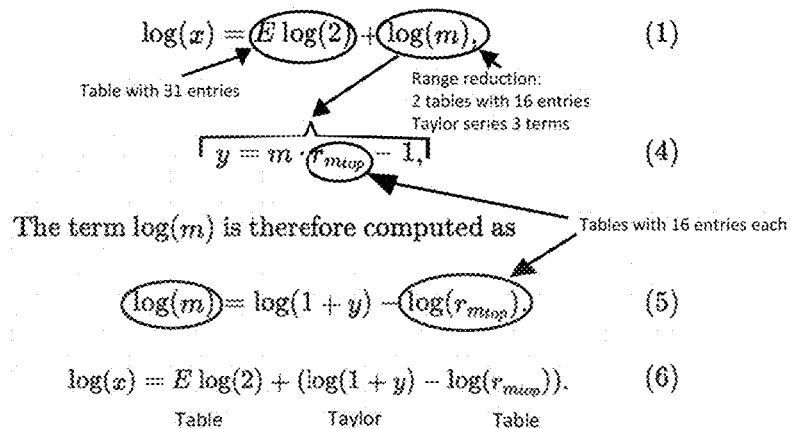

FIG. 7B $$\log(1+y) = y\left(1 - \frac{y}{2} + \frac{y^2}{3} - \frac{y^3}{4} + \cdots\right),$$

Implementation *TaylorExpansion*

$$\log(1+y) = y\left(1 + y\left(-\frac{1}{2} + y\frac{1}{3}\right)\right)$$

FIG. 7C

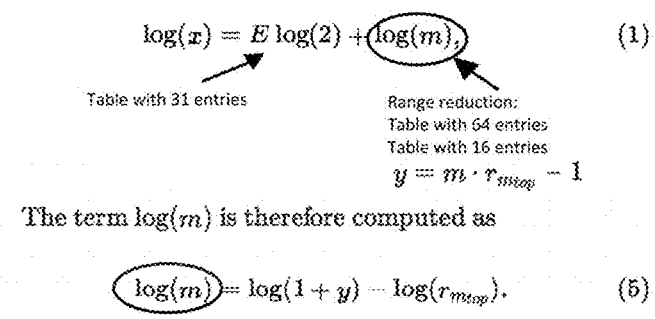

FIG. 7D

ARCHITECTURE FOR TABLE-BASED MATHEMATICAL OPERATIONS FOR INFERENCE ACCELERATION IN MACHINE LEARNING

CROSS-REFERENCE TO RELATED APPLICATIONS

This application is a continuation of U.S. patent application Ser. No. 16/420,028, filed May 22, 2019, which is a continuation-in-part of U.S. patent application Ser. No. 16/226,559, filed Dec. 19, 2018, and claims the benefit of U.S. Provisional Patent Application No. 62/675,076, filed May 22, 2018. All of which are incorporated herein in their entireties by reference.

BACKGROUND

Applied Machine Learning (ML) is a booming field that utilizes a cascade of layers of nonlinear processing units and algorithms for feature extraction and transformation with a wide variety of usages and applications. ML typically involves two phases, training, which uses a rich set of training data to train a plurality of machine learning models, and inference, which applies the trained machine learning models to actual applications. Each of the two phases poses a distinct set of requirements for its underlying infrastructures. Various infrastructures may be used, e.g., graphics processing unit (GPU), a central processing unit (CPU), a Field Programmable Gate Array (FPGA), an Application Specific Integrated Circuit (ASIC), etc. Specifically, the training phase focuses on, as a non-limiting example, GPU or ASIC infrastructures that scale with the trained models and retraining frequency, wherein the key objective of the training phase is to achieve high performance and reduce training time. The inference phase, on the other hand, focuses on infrastructures that scale with the applications, user, and data, and the key objective of the inference phase is to achieve energy (e.g., performance per watt) and capital (e.g., return on investment) efficiency.

Inference phase of ML is usually very computationally and data intensive. Unfortunately, as the input data and model sizes grow, data movement becomes a bottleneck and data processing increases because in order to perform simple processing, three operations or instructions are performed for each data, e.g., load, processing, and store. As the amount of data grows, performing these three operations or instructions becomes burdensome. Moreover, the current computing architecture is not scalable and are not well suited for ML and its applications, since a lot of time goes in loading and storing the data in comparison to processing the data.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3A depicts an example of a lookup table used to implement the exponent portion of a logarithmic function; FIG. 3B depicts an example of a lookup table used to implement the mantissa portion of the logarithmic function according to one aspect of the present embodiments.

FIG. 4 depicts an example outlining main steps to calculate the logarithmic function under a first approach according to one aspect of the present embodiments.

FIG. 5 depicts an example of a lookup table used to replace Taylor expansion for a portion of the logarithmic function according to one aspect of the present embodiments.

FIG. 6 depicts an example outlining main steps to calculate the logarithmic function under a second approach according to one aspect of the present embodiments.

FIGS. 7A-7D depicts a plurality of equations utilized to implement log function for floating point input value according to one aspect of the present embodiments.

DETAILED DESCRIPTION

Figure 1:
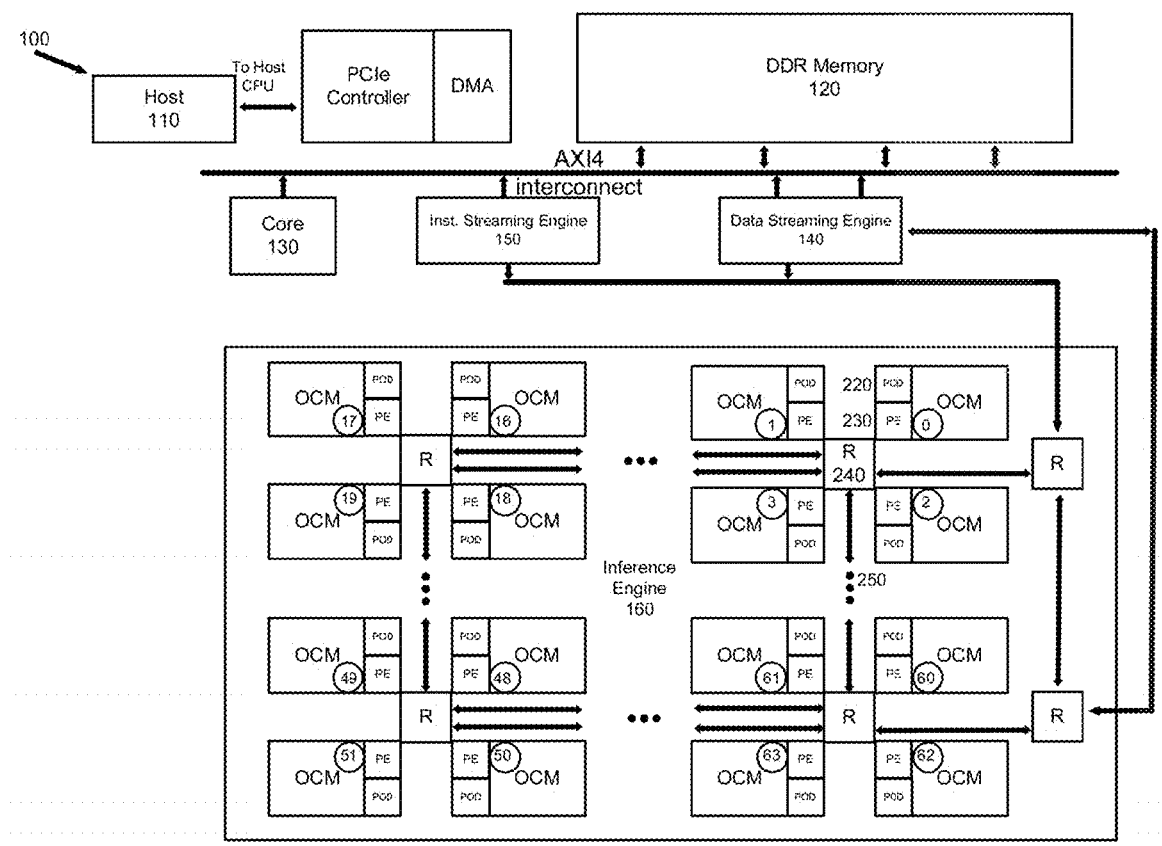
FIG. 1 depicts an example of diagram of a hardware-based programmable architecture configured to support inference acceleration for machine learning according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

FIG. 1 depicts an example of a diagram of a hardware-based programmable system/architecture 100 configured to support inference acceleration for machine learning. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

Each of the engines in the architecture 100 is a dedicated hardware block/component including one or more microprocessors and on-chip memory units storing software instructions programmed by a user for various machine learning operations. When the software instructions are executed by the microprocessors, each of the hardware components becomes a special purposed hardware component for practicing certain machine learning functions as discussed in detail below. In some embodiments, the architecture 100 is on a single chip, e.g., a system-on-chip (SOC).

In the example of FIG. 1, the architecture 100 may include a host 110 coupled to a memory (e.g., DDR) 120 and a core engine 130 via a PCIe controller and/or a direct memory access (DMA) module. The host 110 is a processing unit configured to receive or generate data to be analyzed and/or inferred by architecture 100 via machine learning. The DDR memory 120 is coupled to a data streaming engine 140 configured to transfer/stream data between the DDR memory 120 and on-chip memory (OCM) 210 of an inference engine 160 discussed below via DMA (DDR-to-OCM DMA or DoD). The core 130 is a processing engine configured to receive and interpret a plurality of ML commands from the host 110 into instructions for a ML operation. The core 130 is also configured to process a plurality of performance non-critical operations, e.g., data/instruction preparatory work, data collection, data mapping, etc. The core 130 is coupled to an instruction-streaming engine 150, which accepts instructions destined for the inference engine 160 from the core 130 and distributes the instructions to the appropriate units within the inference engine 160. The inference engine 160 is configured to perform dense and sparse operations on received stream of data, e.g., to identify a subject in an image, by using the training data and executing the programming instructions received from the instruction-streaming engine 150.

In some embodiments, the inference engine 160 includes a two-dimensional computing array of processing tiles, e.g., tiles 0, . . . , 63, arranged in, e.g., 8 rows by 8 columns. Each processing tile (e.g., tile 0) includes at least one on-chip memory (OCM) e.g., 210, one POD engine (or POD), e.g., 220, and one processing engine/element (PE), e.g., 230. Here, the OCMs in the processing tiles are configured to receive data from the data streaming engine 140 in a streaming fashion. The OCMs enable efficient local access to data per processing tile. The PODs are configured to perform dense or regular computations on the received data in the OCMs, e.g., matrix operations such as multiplication, matrix manipulation, tanh, sigmoid, and other table-based mathematical operations/functions as discussed below, and the PEs are configured to perform sparse/irregular computations and/or complex data shape transformations of the received data in the OCMs, e.g., memory transpose, addition operation, operations on irregular data structures (such as trees, graphs, and priority queues), respectively. Both the PODs and the PEs can be programmed according to the programming instructions received from the instruction-streaming engine 150. Accordingly, the data is received and processed by each processing tile as an input data stream from the DDR memory 120 and the result is output by each processing tile as a stream of data to the DDR memory 120.

In some embodiments, a plurality of (e.g., four) processing tiles together form a processing block or quad, e.g., processing tiles 0-3 forms processing block 250, wherein the processing tiles within each processing block are coupled to one another via a routing element 240. In some embodiments, all the routing elements are connected together as a mesh interconnect to connect the processing blocks in the same row or column as a two-dimensional array. It is appreciated that the number and/or types of components within each processing tile, the formation of the processing blocks, the number of processing tiles in each processing block, and the number of processing blocks in each row and column of the inference engine 160 as shown in FIG. 1 are exemplary and should not be construed as limiting the scope of the embodiments. In some embodiments, the same number of PE and POD may be used for each tile, and the same number of blocks may be used in each row and column in order to provide flexibility and scalability.

Figure 2:
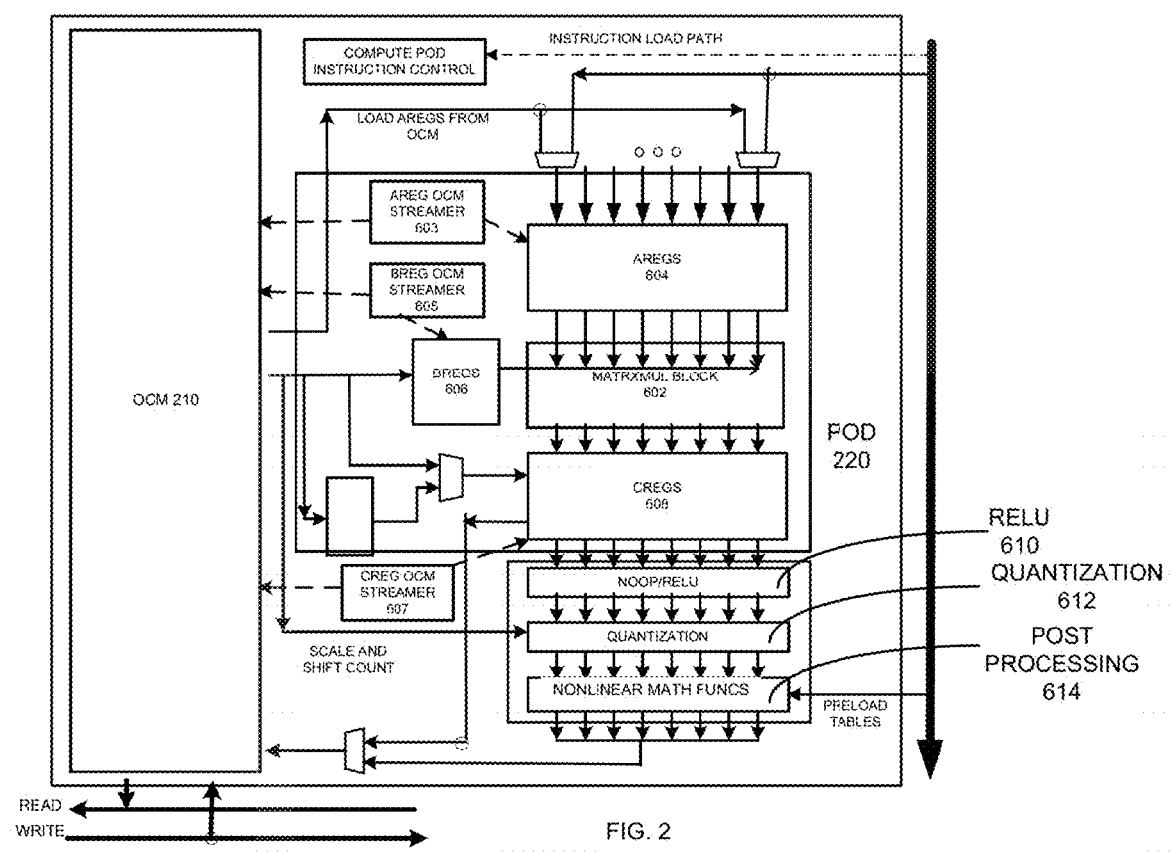
FIG. 2 depicts a diagram of an example of the micro-architecture of the POD engine in FIG. 1 according to one aspect of the present embodiments.

In the example of FIG. 1, the POD engine 220 is configured to perform dense-matrix computation such as matrix-matrix multiply and element-wise math operations on data in the OCM 210. FIG. 2 depicts a diagram of an example of the microarchitecture of the POD engine 220. It is appreciated that the number of components, the size of the components, and the number of bits, matrix sizes, etc. shown in FIG. 2 are for illustrative purposes and not intended to limit the scope of the embodiments. In the example of FIG. 2, the POD 220 includes a matrix multiplication block 602, which is a two-dimensional array having X number of rows and Y number of columns, wherein each element/cell in the array has a certain number of registers maintaining data streamed to and from the OCM 210. The matrix multiplication block 602 is configured to multiply two matrices, matrix A of X number of rows and Z number of columns and matrix B of Z number of rows and Y number of columns to generate a matrix C of X number of rows and Y number of columns. In some embodiments, the matrix multiplication block 602 is fed by A registers 604 and B registers 606, which hold the two matrices, A and B, for multiplication by the matrix multiplication block 602, respectively. The matrix data are written into A registers 604 and B registers 606 from the OCM 210 by Areg OCM streamer 603 and Breg OCM streamer 605, respectively. Partial result of the multiplication of the two matrices by the matrix multiplication block 602 is accumulated and saved in C registers 608, which is then streamed to the OCM 210 via Creg OCM streamer 607. In some embodiments, the matrix multiplication block 602 and the register streamers are programmed using instructions from the instruction streaming engine 150, wherein the instructions specify the address, length and stride of the stream to be loaded from the OCM 210 and the matrix multiplication operations performed by the matrix multiplication block 602. In some embodiments, the data loading instructions are stalled when the registers and/or buffers are full and will resume when there is space to accommodate the data.

During and/or following matrix multiplication, the POD engine 220 is configured to perform a plurality of inline post processing operations immediately on output from the matrix multiplication block 602 saved in the C registers 608 without having to transmit and save the output to the OCM 210 first and then read the C matrix from the OCM 210 again for these post matrix multiplication operations. By bypassing the roundtrip to the OCM 210, the inline post processing operations following the matrix multiplication saves time and improves efficiency of the ML operation by the inference engine 160. As shown by the example of FIG. 2, the inline post processing operations supported by the POD engine 220 include but are not limited to a rectified linear operation by an inline rectified linear unit (ReLU) 610, a quantization operation by an inline quantization unit 612, and inline table-based operations by an inline sigmoid post processing unit 614.

In some embodiments, the inline post processing unit 614 of the POD engine 220 is configured to perform a plurality of non-linear mathematical or math functions/operations including but not limited to logarithmic function (e.g., natural log), exponential function (e.g., exp), and trigonometric functions (e.g., sin, cos, tan, etc.) on the output from the matrix multiplication block 602 on per-element basis before writing the output to the OCM 210. Due to their non-linear nature, computing values of these non-linear math functions accurately often consumes tremendous amount of computing time as well as computing resources in terms of processing power and/or memory. In some embodiments, the inline post processing unit 614 is configured to perform each of the non-linear math operations on the output via a corresponding lookup table, wherein values of the lookup table can be preloaded into, accepted and maintained by the inline post processing unit 614 from the memory 120 by the core 130. The inline post processing unit 614 is configured to determine a corresponding value of a math function by looking up a value x from its corresponding lookup table. Such table-based math function computation is fast and saves a lot of computing resources. Although the result from the table-based computation approximates the non-linear math function and may not be 100% accurate, such approximation is often good enough for the ML operations by the inference engine 160.

In some embodiments, since different sections and models may be used to approximate the non-linear math functions based on numerical analysis, the inline post processing unit 614 is configured to utilize multiple lookup tables to approximate and implement a non-linear math function via piece-wise linear approximation. Specifically, the inline post processing unit 614 is configured to divide the non-linear math function into multiple sections, where each section is represented by a curve that is extrapolated based on a specific lookup table. The inline post processing unit 614 may then determine a value of the non-linear math function by referencing a specific lookup table corresponding to a section associated with a known x value and fetch the value of the non-linear math function from the corresponding lookup table accordingly.

Natural Logarithm Function

In the discussions below, floating-point natural logarithm function is used as a non-limiting example to illustrate how the inline post processing unit 614 is configured to approximate the non-linear math functions in one or more of the embodiments. It is understood by one ordinarily skilled in the art that the inline post processing unit 614 is configured to apply similar approaches to other types of non-linear math functions.

In some embodiments, the inline post processing unit 614 is configured to compute and implement natural logarithm or log function for floating point input values (e.g., fp16) under two alternative approaches, both conduct an input range check on the floating point input values since as log is only defined for positive values of x and will return an error indication, e.g., not a number (NAN) for any input x≤0. The first approach utilizes smaller lookup tables and a Taylor series expansion, while the second approach eliminates the Taylor series thus reducing computational complexity while using larger lookup tables as tradeoffs.

In some embodiments, the inline post processing unit 614 is configured to implement log function for floating point input value x under the first approach by taking advantage of floating number (e.g., fp16) format/expression of the input value x as exponent (e) and mantissa (m) portions and using the exponent and mantissa values of x for the log function computation. In the example of fp16 format, the input value x can be represented as:

$$x = (-1)^{signbit} \times 2^{exponent-15} \times 1.significantbits_2$$

log(x) can then be calculated using Equations (1), (2), and (3) as shown in FIG. 7A. In some embodiments, the inline post processing unit 614 is configured to replace 1. f>√2 with 1. f>1.5 for ease of implementation wherein the most significant bit (MSB) of f (e.g., F[9]—bit 9 for fp 16) determines if 1. f>1.5.

In some embodiments, the inline post processing unit 614 is configured to implement the log function of Equation (1) above by utilizing multiple lookup tables plus a Taylor series expansion. As illustrated by the non-limiting example below, the exponent portion E log(2) can be implemented using a lookup table having 31 entries as shown by the example of FIG. 3A while the mantissa portion log(m) can be implemented using two lookup tables having 16 entries each plus a Taylor expansion as shown by Equations (4), (5) and (6) in FIG. 7B. In some embodiments, the inline post processing unit 614 is configured to implement log (m) using a single table to retrieve both values for $r_{m_{top}} = 1/m_{top}$ and $-\log(r_{m_{top}})$ with one access via the same index value as shown by the example of FIG. 3B. In some embodiments, the inline post processing unit 614 is configured to limit the Taylor expansion of log(1+y) to the first three terms as shown in FIG. 7C to simply the computation while still achieving result accurate enough for the log function computation. FIG. 4 depicts an example outlining main steps to calculate log (x) under the first approach as discussed above.

In some embodiments, the inline post processing unit 614 is configured to implement the log function for floating point input value x under an alternative, second approach, which, unlike the first approach, eliminates the Taylor series approximation and uses only lookup tables based on exponent and mantissa values. Additionally, the second approach eliminates all floating point (e.g., fp16) multiplications. In some embodiments, the inline post processing unit 614 is configured to calculate an index to the tables via integer arithmetic by utilizing bit operations.

One of the main differences between the first and the second approaches is the replacement of the Taylor series of the term log(1+y) with a table lookup operation. Specifically, as illustrated by the non-limiting example shown in FIG. 7D, E log(2) and $-\log(r_{m_{top}})$ in log(m) are calculated using tables of 31 and 64 entries, respectively, with the first one identical to the table described in the first approach and the second table being an extension of the 16 entry table of the first approach. In addition, a new table of, e.g., 16 entries as shown in the example of FIG. 5, is used to implement/look up values of log(1+y) instead of the three-term Taylor expansion under the first approach. The example in FIG. 5 also shows the integer arithmetic used to calculate the index to the table. FIG. 6 depicts an example outlining main steps to calculate log (x) under the second approach as discussed above.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A processing unit to support inline processing, comprising:
an inline processing unit configured to
accept and maintain a plurality of lookup tables for performing each of one or more non-linear operations on data received from a memory or a first processing block;
divide the one or more non-linear operations into multiple sections, where each section is represented by a curve that is extrapolated based on a specific lookup table of the plurality of lookup tables;
determine a value of the one or more non-linear operations by referencing the specific lookup table corresponding to a section of the multiple sections associated with an input value from the data to perform the one or more non-linear operations on the data;
stream processing result of the one or more non-linear operations to one or more of the memory, the first processing unit, and a second processing unit after the one or more non-linear operations are complete; and
one or more of:
an inline rectified linear unit (ReLU) configured to perform a rectified linear operation on the data received from the memory or the first processing block;
an inline quantization unit configured to perform a quantization operation the data received from the memory or the first processing block.

2. The processing unit of claim 1, wherein:
the memory is an on-chip memory (OCM).

3. The processing unit of claim 1, wherein:
the inline processing unit is configured to utilize multiple lookup tables to approximate and implement one of the one or more non-linear operations via piece-wise linear approximation.

4. The processing unit of claim 1, wherein:
the one or more of the non-linear operations is a logarithmic operation for floating-point input values.

5. The processing unit of claim 4, wherein:
the inline processing unit is configured to conduct an input range check on a floating-point input value to the logarithmic operation and return an error indication if the input value is non-positive.

6. The processing unit of claim 4, wherein:
the inline processing unit is configured to implement the logarithmic operation for a floating-point input value by adopting a floating number expression of the input value as exponent and mantissa portions and using the exponent and mantissa values of the input value for the computation.

7. The processing unit of claim 6, wherein:
the inline processing unit is configured to implement the logarithmic operation on the mantissa portion of the input value using a single lookup table via one same index value.

8. The processing unit of claim 6, wherein:
the inline processing unit is configured to implement the logarithmic operation for the floating-point input value by utilizing a Taylor series expansion of different portions of the floating number expression of the input value, respectively.

9. The processing unit of claim 8, wherein:
the inline processing unit is configured to implement the logarithmic operation for the floating-point input value by replacing the Taylor series expansion with a table lookup operation.

10. The processing unit of claim 6, wherein:
the inline processing unit is configured to implement the logarithmic operation for the floating-point input value by utilizing multiple lookup tables for different portions of the floating number expression of the input value, respectively, without a Taylor series expansion.

11. A method to support inline processing, comprising:
accepting and maintaining a plurality of lookup tables for performing each of one or more non-linear operations on data received from a memory or a first processing block, wherein one of the one or more non-linear operations is a logarithmic operation for floating-point input values;
conducting an input range check on a floating-point input value to the logarithmic operation and return an error indication if the input value is non-positive;
dividing the one or more non-linear operations into multiple sections, where each section is represented by a curve that is extrapolated based on a specific lookup table of the plurality of lookup tables;
determining a value of the one or more non-linear operations by referencing the specific lookup table corresponding to a section of the multiple sections associated with an input value from the data to perform the one or more non-linear operations on the data;
streaming processing result of the one or more non-linear operations to one or more of the memory, the first processing unit, and a second processing unit after the one or more non-linear operations are complete.

12. The method of claim 11, further comprising:
utilizing multiple lookup tables to approximate and implement one of the one or more non-linear operations via piece-wise linear approximation.

13. The method of claim 11, wherein:
the memory is an on-chip memory (OCM).

14. The method of claim 11, further comprising:
implementing the logarithmic operation for a floating-point input value by adopting a floating number expression of the input value as exponent and mantissa portions and using the exponent and mantissa values of the input value for the computation.

15. The method of claim 14, further comprising:
implementing the logarithmic operation on the mantissa portion of the input value using a single lookup table via one same index value.

16. The method of claim 14, further comprising:
implementing the logarithmic operation for the floating-point input value by utilizing a Taylor series expansion of different portions of the floating number expression of the input value, respectively.

17. The method of claim 16, further comprising:
implementing the logarithmic operation for the floating-point input value by replacing the Taylor series expansion with a table lookup operation.

18. The method of claim 14, further comprising:
implementing the logarithmic operation for the floating-point input value by utilizing multiple lookup tables for different portions of the floating number expression of the input value, respectively, without a Taylor series expansion.

19. A processing unit to support inline processing, comprising:
an inline processing unit configured to
accept and maintain a plurality of lookup tables for performing each of one or more non-linear operations on data received from a memory or a first processing block, wherein the one or more of the non-linear operations is a logarithmic operation for floating-point input values;
conduct an input range check on a floating-point input value to the logarithmic operation and return an error indication if the input value is non-positive;
divide the one or more non-linear operations into multiple sections, where each section is represented by a curve that is extrapolated based on a specific lookup table of the plurality of lookup tables;
determine a value of the one or more non-linear operations by referencing the specific lookup table corresponding to a section of the multiple sections associated with an input value from the data to perform the one or more non-linear operations on the data;
stream processing result of the one or more non-linear operations to one or more of the memory, the first processing unit, and a second processing unit after the one or more non-linear operations are complete.

* * * * *